(No Model.)
C. B. CLARK.
REELETTE.
No. 277,231.  Patented May 8, 1883.
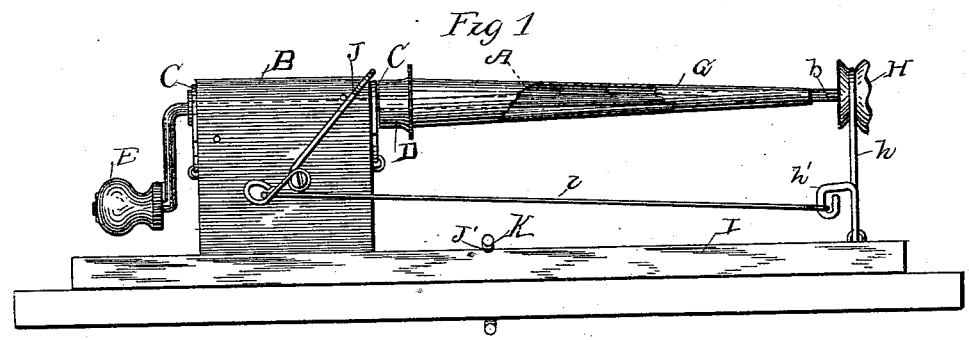
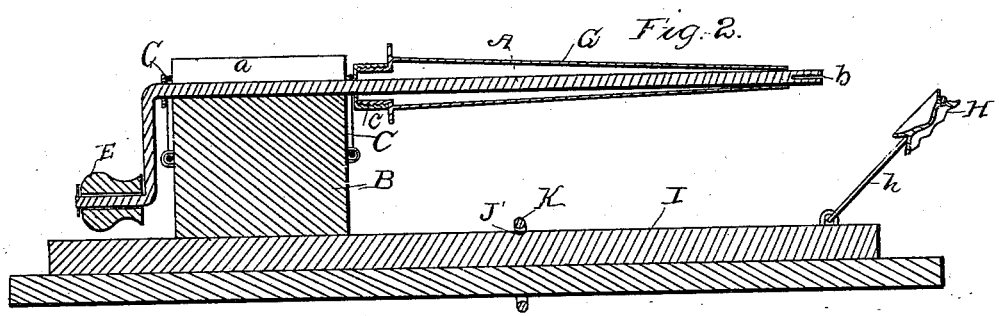
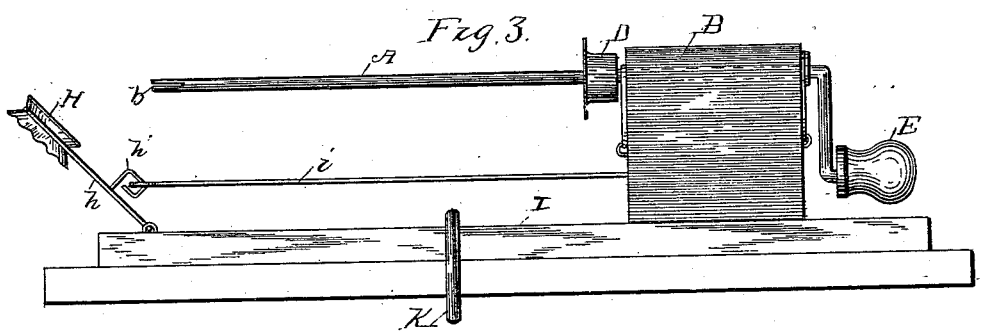
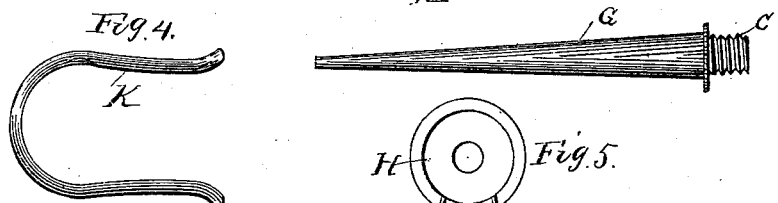
WITNESSES
W. E. Bowen.
Chas. R. Burr
INVENTOR
Cullen B. Clark
By Myers & Co.
ATTORNEYS

UNITED STATES PATENT OFFICE.

CULLEN B. CLARK, OF DETROIT, MICHIGAN.

REELETTE.

SPECIFICATION forming part of Letters Patent No. 277,231, dated May 8, 1883.

Application filed January 29, 1883. (No model.)

*To all whom it may concern:*

Be it known that I, C. B. CLARK, a citizen of the United States of America, residing at Detroit, in the county of Wayne and State of Michigan, have invented certain new and useful Improvements in Reelettes, of which the following is a specification, reference being had therein to the accompanying drawings.

This invention pertains to improvements in machines for making tubular spiral points from silk, muslin, or other textile material for fancy articles, such as fans, &c.; and it consists in the employment of a slitted or slotted cylindrical shaft adapted to permit the attachment thereto of a hollow conical sleeve or former, said shaft bearing in a suitable support and having means for its rotation; and it consists, further, of a pivoted or hinged bearing for the free end of the shaft, said bearing being adapted to be adjusted to and from the said end of the shaft, substantially as hereinafter more fully set forth and claimed.

In the accompanying drawings, Figure 1 is a side view, with a portion of the shaft-bearing broken away, of my improved machine for making tubular points of textile material. Fig. 2 is a longitudinal sectional view thereof with the pivoted bearing in a depressed position or removed from the shaft. Fig. 3 is a side view of the same with the conical sleeve or former removed and shown at one side of the machine, and Figs. 4 and 5 are detail views.

In carrying out my invention I employ a cylindrical shaft, A, mounted in a longitudinal slot or recess, $a$, of a block or support, B, said shaft being removably held therein by approximately C-shaped springs or rings C, passed through eyes of the block and caused to fit over the shaft. These springs also compensate wear of the shaft in its bearings. The inner end of the shaft A has a handle or crank, E, for its rotation, while on the opposite side of the support B it is provided with an internally-screw-threaded hub or fixed collar, D, and at its extreme outer end with a longitudinal slit or slot, $b$.

G is a conical sleeve or former with its inner end or base provided with an external screw-thread, as at $c$, to enable it to be screwed into the internally-screw-threaded collar or hub D of the shaft A, by means of which the said sleeve or former is adapted, after being slipped over the said shaft, to be attached thereto, its tapering or smaller end being sufficiently reduced in diameter to cause it to fit snugly around the shaft, and to constitute, in effect, a part of the shaft, to provide it with a conical surface, the function of which will presently appear.

H is the bearing or support for the outer end of the shaft, said bearing consisting preferably of a disk with a concavity to receive the said end of the shaft, and of a support or legs, $h$, hinged or pivoted in eyes or other suitable way, said eyes being screwed to a base, I, supporting the entire machine. This bearing-support $h$, or one of its legs, has a crank, $h'$, to which is connected by a rod, $i$, a hand-lever, J, pivoted to one side of the shaft-support B. By moving the said lever with the hand the said bearing H can be moved or adjusted away from, or to, the outer end of the shaft, as occasion may require, as will be understood hereinafter.

K is an approximately U-shaped clamp with one arm adapted to fit into a transverse groove, $j'$, in the base I, and its other arm to extend under the bench or support, and thus enable the convenient securing in place of the machine for operation.

If a straight or cylindrical tubular point is to be made, the conical sleeve is removed, and the end of the textile material inserted into and secured in the slot at the outer end of the shaft. Then by turning the crank or handle of the shaft with one hand and holding the textile material with the other hand, the material will be coiled into the desired form.

If a conical point is desired, the sleeve or former is put in position, as above indicated, and the same course pursued as pointed out in connection with forming the cylindrical point.

It will be noticed that previous to and in order to permit the insertion of the end of the textile material into the slot in the outer end of the shaft the bearing H is adjusted or moved away from the said end of the shaft, which is effected by moving the lever J in the required direction. After the insertion of the textile material into the slot the bearing is moved back into its original position to support that end of the shaft, which is done by reversing the movement of the lever J.

Having thus fully described my invention, I claim and desire to secure by Letters Patent—

1. The handled shaft suitably mounted in position, and having a longitudinal slit or slot in one end, in combination with the pivoted or hinged bearing adapted to support the free end of the said shaft, substantially as and for the purpose specified.

2. The handled slitted or slotted shaft suitably supported in position, in combination with the pivoted bearing connected by a rod to a hand-lever, substantially as and for the purpose described.

3. The combination of the handled cylindrical shaft having a screw-threaded collar and a slit or slot at one end, the conical sleeve having a screw-threaded base, the support for the inner end of the shaft, the shaft-holding rings, the pivoted or hinged bearing, the hand-lever connected to said latter bearing, substantially as and for the purpose indicated.

In testimony whereof I affix my signature in presence of two witnesses.

CULLEN B. CLARK.

Witnesses:
W. G. YOUNG,
T. C. PROSSER.